(12) United States Patent
Yoon

(10) Patent No.: US 12,355,295 B2
(45) Date of Patent: Jul. 8, 2025

(54) BATTERY SYSTEM AND METHOD FOR MANAGING BATTERY SYSTEM

(71) Applicant: LG ENERGY SOLUTION, LTD., Seoul (KR)

(72) Inventor: Ho Byung Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 732 days.

(21) Appl. No.: 17/631,986

(22) PCT Filed: Aug. 4, 2020

(86) PCT No.: PCT/KR2020/010242
§ 371 (c)(1),
(2) Date: Feb. 1, 2022

(87) PCT Pub. No.: WO2021/033956
PCT Pub. Date: Feb. 25, 2021

(65) Prior Publication Data
US 2022/0285951 A1 Sep. 8, 2022

(30) Foreign Application Priority Data
Aug. 20, 2019 (KR) .......................... 10-2019-0101894

(51) Int. Cl.
*H02J 7/14* (2006.01)
*B60L 58/22* (2019.01)
(Continued)

(52) U.S. Cl.
CPC .............. *H02J 7/342* (2020.01); *B60L 58/22* (2019.02); *H02J 7/0019* (2013.01);
(Continued)

(58) Field of Classification Search
CPC ........ H02J 7/342; H02J 7/0019; H02J 7/0016; H02J 7/007182; B60L 58/22;
(Continued)

(56) References Cited

U.S. PATENT DOCUMENTS 5,869,950 A * 2/1999 Hoffman, Jr. ......... B60W 10/26
320/132
2010/0231166 A1 9/2010 Lee et al.
(Continued)

FOREIGN PATENT DOCUMENTS

JP 2011-501640 A 1/2011
JP 2013-128354 A 6/2013
(Continued)

OTHER PUBLICATIONS

International Search Report (PCT/ISA/210) issued in PCT/KR2020/010242, dated Nov. 13, 2020.

*Primary Examiner* — Arun C Williams
(74) *Attorney, Agent, or Firm* — Birch, Stewart, Kolasch & Birch, LLP

(57) ABSTRACT

A battery system includes: at least two battery packs; a plurality of first relays, each first relay being connected to a respective one of the at least two battery packs; and an auxiliary battery, a first battery pack among the at least two battery packs with a highest voltage is discharged to the auxiliary battery through the first relay connected to the first battery pack so that a voltage of the first battery pack approaches a voltage of another battery pack, a second battery pack with a lowest voltage is charged by the auxiliary battery through the first relay connected to the second battery pack so that the voltage of the second battery pack may approach the voltage of the another battery pack, and the at least two battery packs are connected in parallel.

15 Claims, 5 Drawing Sheets

(51) Int. Cl.
*H02J 7/00* (2006.01)
*H02J 7/34* (2006.01)
*H01M 10/42* (2006.01)

(52) U.S. Cl.
CPC .......... *B60L 2210/10* (2013.01); *H01M 10/42* (2013.01); *H02J 7/0016* (2013.01)

(58) Field of Classification Search
CPC ........... B60L 2210/10; B60L 2240/547; B60L 58/13; B60L 58/20; H01M 10/42; H01M 2010/4271
USPC ........................................................ 320/126
See application file for complete search history.

(56) References Cited

U.S. PATENT DOCUMENTS

| | | | | |
|---|---|---|---|---|
| 2012/0262121 | A1* | 10/2012 | Kuo | H02J 7/0019 320/128 |
| 2014/0079960 | A1* | 3/2014 | Yun | H02J 7/34 429/7 |
| 2014/0340044 | A1* | 11/2014 | Kim | H02J 7/0014 320/134 |
| 2017/0093183 | A1* | 3/2017 | Shen | H02J 7/0047 |
| 2017/0244258 | A1* | 8/2017 | Yao | H02J 7/342 |
| 2017/0271886 | A1 | 9/2017 | Park | |
| 2018/0083460 | A1* | 3/2018 | Min | H01M 10/44 |
| 2019/0044194 | A1 | 2/2019 | Hong et al. | |
| 2019/0052119 | A1* | 2/2019 | Hendrix | H02J 7/0018 |
| 2020/0373764 | A1* | 11/2020 | Lee | H02J 7/0063 |
| 2021/0028503 | A1* | 1/2021 | Hilligoss | H02M 3/1582 |

FOREIGN PATENT DOCUMENTS

| | | | |
|---|---|---|---|
| KR | 10-2010-0093464 A | | 8/2010 |
| KR | 10-1122598 B1 | | 3/2012 |
| KR | 10-2013-0127056 A | | 11/2013 |
| KR | 10-2014-0072433 A | | 6/2014 |
| KR | 20150081987 A | * | 7/2015 |
| KR | 10-1572178 B1 | | 11/2015 |
| KR | 10-2016-0046221 A | | 4/2016 |
| KR | 10-1729820 B1 | | 4/2017 |
| KR | 10-1811062 B1 | | 12/2017 |
| KR | 10-2018-0044483 A | | 5/2018 |
| KR | 10-1909104 B1 | | 10/2018 |

* cited by examiner

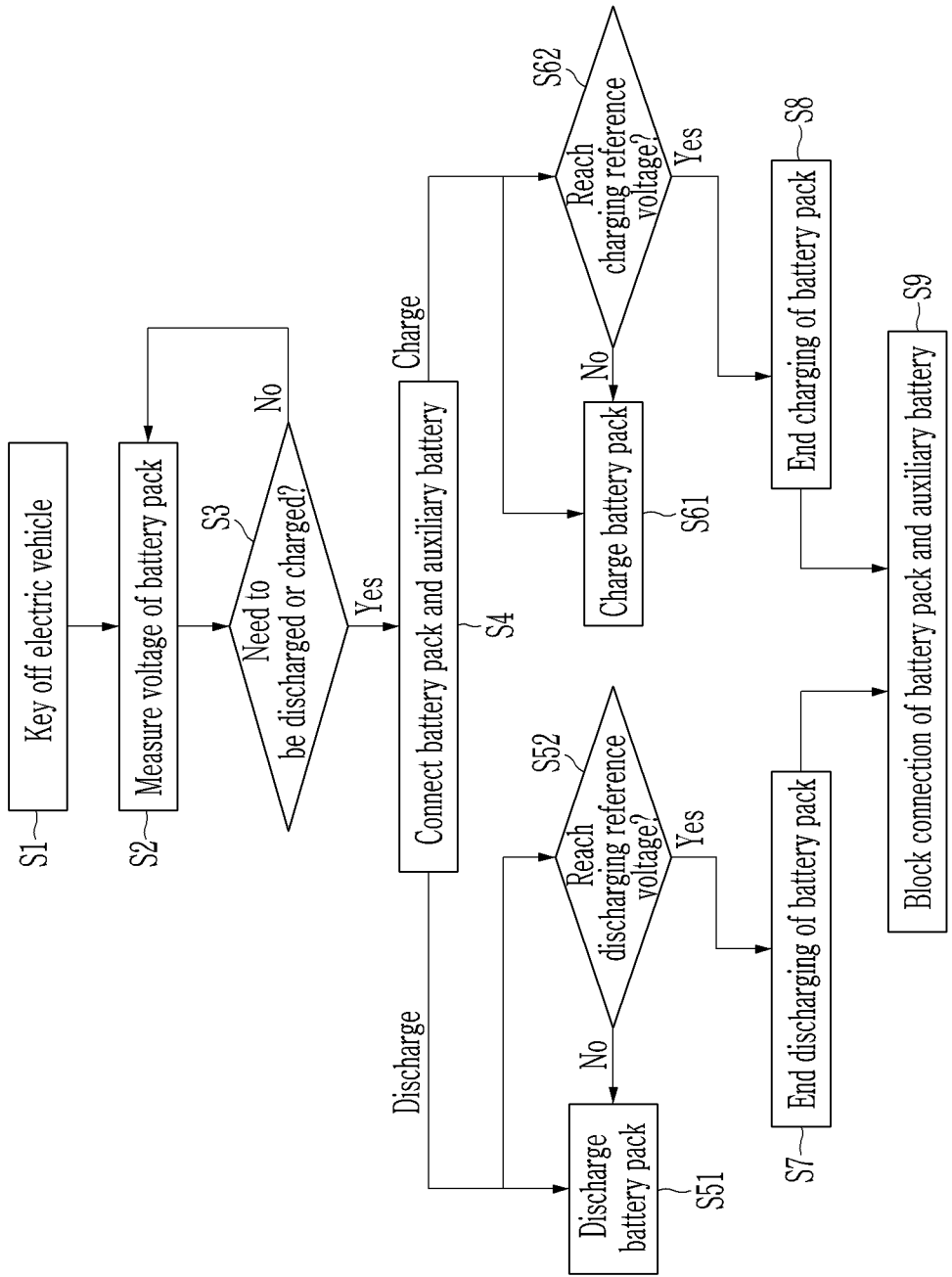

BATTERY SYSTEM AND METHOD FOR MANAGING BATTERY SYSTEM

TECHNICAL FIELD

This application claims priority to and the benefit of Korean Patent Application No. 10-2019-0101894 filed in the Korean Intellectual Property Office on Aug. 20, 2019, the entire contents of which are incorporated herein by reference.

The present disclosure relates to a battery system and a method for managing a battery system.

BACKGROUND ART

A battery system in which a plurality of battery packs are connected in parallel may be applied to electric storage systems and high-capacity electric vehicles.

A plurality of battery packs are degenerated at different levels, so there may be deviation of voltage and capacity among a plurality of battery packs. When a plurality of battery packs are coupled in parallel, an overcurrent caused by the deviation of voltage and capacity among a plurality of battery packs may be generated.

Further, when a leakage current is generated to a cell of a specific battery pack from among a plurality of battery packs connected in parallel, a current blow phenomenon is generated to the cell at which the leakage current is generated, so dangerous situations such as ignition may be generated.

DISCLOSURE

The present invention has been made in an effort to provide a battery system for preventing generation of an overcurrent caused by voltage and capacity deviation among a plurality of battery packs when the battery packs are connected in parallel, and a method for managing a battery system.

An embodiment of the present invention provides a battery system including: at least two battery packs; a plurality of first relays, each first relay being connected to a respective one of the at least two battery packs between a first line and a second line corresponding to the at least two respective battery packs; and an auxiliary battery, wherein a first battery pack with a highest voltage is discharged to the auxiliary battery through the first relay connected to the first battery pack so that the voltage of the first battery pack approaches a voltage of another battery pack among the at least two battery packs, a second battery pack among the at least two battery packs with a lowest voltage is charged by the auxiliary battery through the first relay connected to the second battery pack so that the voltage of the second battery pack may approach the voltage of the another battery pack, and the at least two battery packs are connected in parallel.

The battery system may further include: a bidirectional DC-DC converter including first and second ends connected to a positive electrode and a negative electrode of the auxiliary battery; and a second relay connected among the first line, the second line, and third and fourth ends of the bidirectional DC-DC converter, wherein a charging path or discharging path of the auxiliary battery includes the second relay and the bidirectional DC-DC converter.

When the first battery pack is discharged, electric power discharged from the first battery pack may charge the auxiliary battery through the first relay connected to the first battery pack, the second relay, and the bidirectional DC-DC converter.

When the second battery pack is charged by the auxiliary battery, electric power discharged from the auxiliary battery may charge the second battery pack through the bidirectional DC-DC converter, the second relay, and the first relay connected to the second battery pack.

The battery system may further include a main control circuit configured to receive battery pack state signals, from the at least two battery packs, for instructing states of the at least two battery packs, detect a battery pack among the at least two battery packs that needs to be charged or discharged based on the battery pack state signals, connect the detected battery pack and the auxiliary battery, and control charging or discharging between the detected battery pack and the auxiliary battery.

Each of at least two battery packs may include a battery management system for generating the battery pack state signal for instructing the state of the corresponding battery pack by measuring a voltage, a current, and a temperature of the corresponding battery pack, and each battery management system may generate a relay driving signal for driving the respective first relay connected to the respective battery pack according to a control of the main control circuit.

The battery system may further include: a bidirectional DC-DC converter controlled by the main control circuit, and including first and second ends connected to a positive electrode and a negative electrode of the auxiliary battery; and a second relay controlled by the main control circuit, and connected among the first line, the second line, and third and fourth ends of the bidirectional DC-DC converter.

When the first battery pack is discharged, the main control circuit may control the respective first relay connected to the first battery pack to be closed, and may close the second relay, and it may control electric power discharged from the first battery pack to be converted by the bidirectional DC-DC converter and be supplied to be the auxiliary battery.

When the second battery pack is charged by the auxiliary battery, the main control circuit may control the respective first relay connected to the second battery pack to be closed, and may close the second relay, and it may control electric power discharged from the auxiliary battery to be converted by the bidirectional DC-DC converter and be supplied to the second battery pack.

Another embodiment of the present invention provides a method for managing a battery system including at least two battery packs, a plurality of first relays, each first relay being connected to a respective one of the at least two battery packs between a first line and a second line corresponding to the at least two respective battery packs, and an auxiliary battery, including: electrically separating the at least two battery packs; detecting a battery pack needing to be charged or discharged from among the at least two battery packs; allowing a first battery pack with a highest voltage to be discharged to the auxiliary battery through the respective first relay connected to the first battery pack so that the voltage of the first battery pack from among the at least two battery packs approaches a voltage of another battery pack among the at least two battery packs; and allowing a second battery pack with a low voltage to be charged by the auxiliary battery through the respective first relay connected to the second battery pack so that the voltage of the second battery pack approaches the voltage of the another battery pack.

The allowing of the first battery pack to be discharged to the auxiliary battery may include allowing electric power discharged from the first battery pack to charge the auxiliary battery through the respective first relay connected to the first battery pack, a second relay, and a bidirectional DC-DC converter, and the second relay and the bidirectional DC-DC converter may be connected between the respective first relay and the auxiliary battery.

The allowing of the second battery pack to be charged by the auxiliary battery may include allowing electric power discharged from the auxiliary battery to charge the second battery pack through a bidirectional DC-DC converter, a second relay, and the respective first relay connected to the second battery pack, and the second relay and the bidirectional DC-DC converter may be connected between the respective first relay and the auxiliary battery.

The method may further include receiving battery pack state signals for instructing states of the at least two battery packs from the at least two respective battery packs, wherein a battery pack needing to be charged or discharged from among the at least two battery packs may be detected based on the battery pack state signals.

The method may further include generating the battery pack state signals for instructing a state of the at least two battery packs by measuring voltages, currents, and temperatures of the at least two respective battery packs.

The battery system for preventing generation of an overcurrent caused by the voltage and capacity deviation among a plurality of battery packs when the battery packs are connected in parallel, and a method for managing a battery system, are provided.

DESCRIPTION OF THE DRAWINGS

FIG. 5 shows a flowchart of a method for managing a battery system according to an embodiment.

MODE FOR INVENTION

Figure 1:
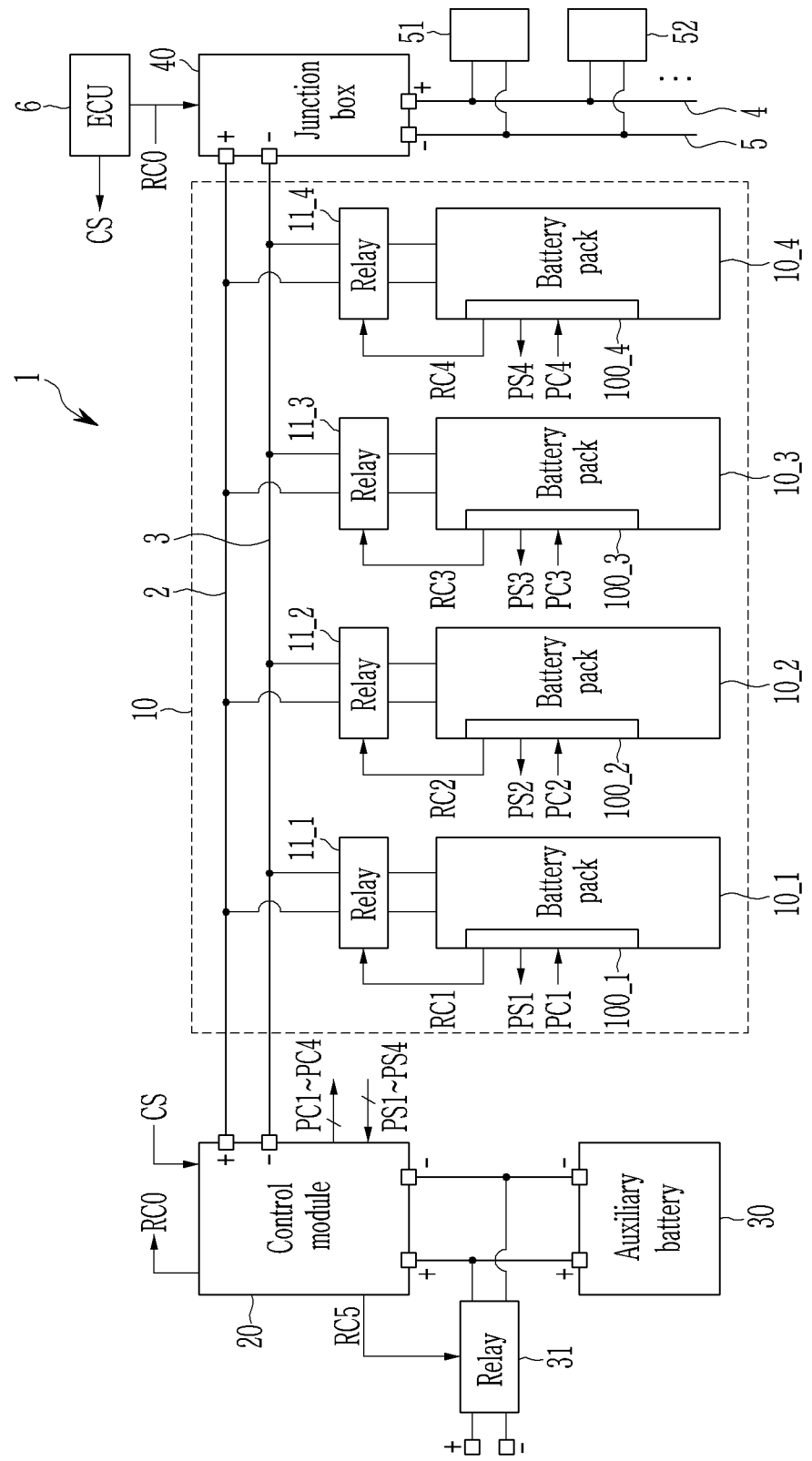
FIG. 1 shows a battery system according to an embodiment.

The present disclosure is applicable to electric vehicles and energy storage systems using a plurality of battery packs connected in parallel to each other. The battery system according to the present disclosure may include an auxiliary battery for adjusting voltages among a plurality of battery packs before connecting the battery packs in parallel, and constituent elements for transmission of electric power between the auxiliary battery and the battery packs. The constituent elements for transmitting electric power may include a bidirectional DC-DC converter, a relay, and a circuit for controlling them.

For example, the corresponding battery pack may be discharged, and the auxiliary battery may be charged by a discharging electric power until the battery pack with a high voltage digressing from a predetermined range from among a plurality of battery packs and the auxiliary battery are connected before a connection in parallel, and the voltage of the corresponding battery pack reaches a reference voltage based on the voltages of other battery packs. Further, the corresponding battery pack may be charged by the electric power transmitted from the auxiliary battery until the battery pack with a low voltage digressing from a predetermined range from among a plurality of battery packs and the auxiliary battery are connected before a connection in parallel, and the voltage of the corresponding battery pack reaches a reference voltage based on the voltages of other battery packs.

In this instance, the auxiliary battery may be charged by the battery pack with a high voltage or may be controlled to be in an appropriate level of a state of charge for charging the low voltage. In addition, the auxiliary battery may supply electric power to an electric field load configuring the electric vehicle or the energy storage system.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. On the other hand, it is to be understood that when one component is referred to as being "connected or coupled directly" to another component, it may be connected to or coupled to the other component without a further component intervening therebetween.

It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof.

FIG. 1 shows a battery system according to an embodiment.

The battery system 1 shown in FIG. 1 includes a battery pack device 10, a control module 20, and an auxiliary battery 30. An electronic control unit (ECU) 6 represents a configuration for controlling an electric vehicle and an energy storage system to which the battery system 1 is applied. For ease of description, an embodiment in which the battery system 1 is applied to the electric vehicle will now be described.

The battery pack device 10 includes four battery packs (10_1 to 10_4) and four relays (11_1 to 11_4). FIG. 1 illustrates that the battery pack device 10 includes four battery packs, which is however an example, and a number of battery packs may be determined according to the needed power supply. Positive electrodes and negative electrodes of the battery packs (10_1 to 10_4) are electrically connected to a first line 2 and a second line 3 through the relays (11_1 to 11_4).

The battery packs (10_1 to 10_4) respectively include battery management systems (BMS) (100_1-100_4). The BMSs (100_1 to 100_4) may generate battery pack state signals (PS1 to PS4) for instructing states of the battery packs by measuring voltages, currents, and temperature of the corresponding battery packs (10_1 to 10_4), may estimate states of charge (SOC) of the corresponding battery packs (10_1 to 10_4), and may generate relay driving signals (RC1 to RC4) for driving the corresponding relays (11_1 to 11_4) according to the battery pack control signals (PC1 to PC4) transmitted from the control module 20.

The control module 20 may manage the battery pack device 10, and it may detect the battery pack that needs to be charged or discharged from among the battery packs (10_1 to 10_4) and may connect it to the auxiliary battery 30 to adjust the voltage of the battery pack.

The control module 20 will now be described with reference to FIG. 2.

Figure 2:
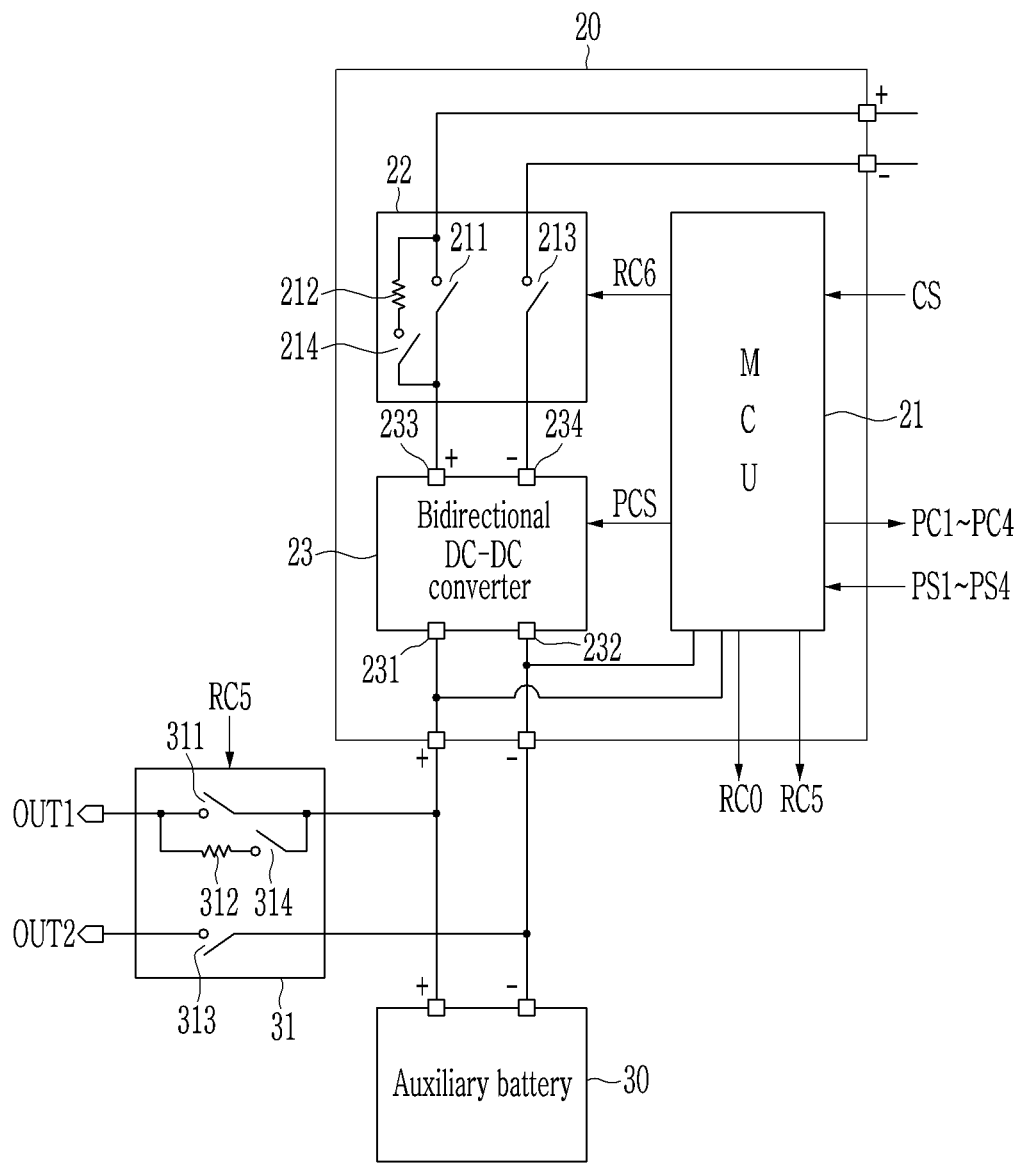
FIG. 2 shows a control module.

FIG. 2 shows a control module according to an embodiment.

The control module 20 may include a main control circuit (MCU) 21, a relay 22, and a bidirectional DC-DC converter 23.

The MCU 21 may receive a control signal (CS) for instructing a driving state of the electric vehicle and the electric power to be supplied from the ECU 6, and the MCU 21 may receive battery pack state signals (PS1 to PS4) from the BMSs (100_1 to 100_4) of the battery packs (10_1 to 10_4). The battery pack state signals (PS1 to PS4) may respectively instruct information on the states of charge, the voltages, the currents, and the temperatures, and problems of the corresponding battery packs (10_1 to 10_4). The MCU 21 may generate battery pack control signals (PC1 to PC4) for controlling management of the battery packs (10_1 to 10_4) based on the battery pack state signals (PS1 to PS4). Further, the MCU 21 may detect the battery pack that needs to be charged or discharged based on the battery pack state signals (PS1 to PS4) received from the separated battery packs (10_1 to 10_4) after the electric vehicle is turned off, and may generate battery pack control signals (PC1 to PC4) so as to control the relays (11_1 to 11_4) connected to the detected battery pack. Further, the MCU 21 may generate a relay control signal RC6 so as to connect the battery packs (10_1 to 10_4) detected to be needed to be charged or discharged from among the battery packs (10_1 to 10_4) and the bidirectional DC-DC converter 23.

The relay 22 includes two switches 211 and 213, a resistor 212 for precharging, and a switch 214. To prevent generation of a surge current when the relay 22 is closed, the precharging resistor 212 and the switch 214 may be connected in parallel to the switch 211, the switch 214 may be turned on for a predetermined time delay, and the switch 211 may be turned on.

A first end of the switch 211 is connected to the first line 2, and a second end of the switch 211 is connected to a positive end 233 of the bidirectional DC-DC converter 23. The resistor 212 and the switch 214 connected in series are connected in parallel to the switch 211. A first end of the switch 213 is connected to the second line 3, and a second end of the switch 213 is connected to a negative end 234 of the bidirectional DC-DC converter 23. The positive end 233 and the negative end 234 of the bidirectional DC-DC converter 23 are distinguished according to relative sizes of the voltages supplied to the respective ends, and do not represent polarities of the voltages. That is, the voltage applied to the positive end is higher than the voltage applied to the negative end, and it is not true that a negative voltage that is lower than a ground voltage is applied to the negative end.

The switch 211, the switch 213, and the switch 214 are operable by the relay control signal RC6. For example, the switch 213 and the switch 214 are turned on according to the on-level relay control signal RC6, the switch 211 is turned on after a predetermined time delay to close the relay 22, and the switch 211 and the switch 213 are turned off according to the off-level relay control signal RC6 to open the relay 22. The switch 214 may be turned off after the switch 211 is turned on.

In this instance, the relays (11_1 to 11_4) connected to the battery packs (10_1 to 10_4) needing to be charged or discharged are closed by the corresponding BMSs (100_1 to 100_4). The relays (11_1 to 11_4) shown in FIG. 1 may be realized as shown in FIG. 3.

Figure 3:
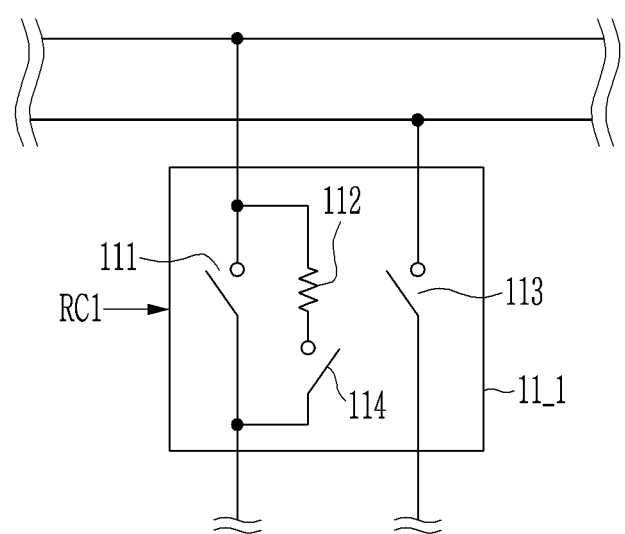
FIG. 3 shows one of relays of a battery pack device.

FIG. 3 shows one of relays of a battery pack device.

FIG. 3 shows the relay 11_1 from among the relays shown in FIG. 1, and the other relays (11_2 to 11_4) may also be realized as shown in FIG. 3.

The relay 11_1 includes two switches 111 and 113 and a resistor 112 for precharging, and a switch 114. A first end of the switch 111 is connected to the first line 2, and a second end of the switch 211 is connected to a positive electrode of the battery pack 10_1. The resistor 112 and the switch 114 connected in series are connected in parallel to the switch 111. A first end of the switch 113 is connected to the second line 3, and a second end of the switch 113 is connected to a negative electrode of the battery pack 10_1. The switch 111 and the switch 113 are operable according to the relay control signal RC1 generated by the BMS 100_1. When receiving an instruction to charge or discharge the battery pack 100_1 from the MCU 21, the BMS 100_1 may be synchronized with a time when the relay 22 is closed and may generate a relay control signal RC1 for closing the relay 11_1 according to a control of the MCU 21. For example, the switch 113 and the switch 114 are turned on according to the on-level relay control signal RC1, the switch 111 is turned on after a predetermined time delay to close the relay 11_1, and the switch 111 is turned on to turn off the switch 114. The switch 111 and the switch 113 are turned off according to the off-level relay control signal RC1 to thus open the relay 11_1.

The bidirectional DC-DC converter 23 transmits electric power for charging or discharging according to the electric power control signal (PCS) transmitted from the MCU 21. The MCU 21 may generate an electric power control signal (PCS) for controlling an electric power transmitting direction and an amount of transmitted electric power of the bidirectional DC-DC converter 23.

For example, when the auxiliary battery 30 is charged from the battery pack with a high voltage from among the battery packs (10_1 to 10_4), the electric power is transmitted through a charging path including a relay connected to the corresponding battery pack, the relay 22, and the bidirectional DC-DC converter 23. The bidirectional DC-DC converter 23 converts the electric power supplied from the corresponding battery pack to charge the auxiliary battery 30 according to the electric power control signal (PCS).

When discharged with the battery pack with a low voltage from among the battery packs (10_1 to 10_4) from the auxiliary battery 30, the electric power is transmitted through a discharging path including the bidirectional DC- DC converter 23, the relay 22, and a relay connected to the corresponding battery pack. The bidirectional DC-DC converter 23 converts the electric power supplied from the auxiliary battery 30 to charge the corresponding battery pack according to the electric power control signal (PCS).

The bidirectional DC-DC converter 23 may be realized with a known bidirectional DC-DC converter, and includes a positive end 231 and a negative end 232 connected to the positive electrode and the negative electrode of the auxiliary battery 30, and the positive end 233 and the negative end 234 connected to the relay 22. When the bidirectional DC-DC converter 23 forms a charging path, the positive end 233 and the negative end 234 represent an input side, and the positive end 231 and the negative end 232 represent an output side. On the contrary, when the bidirectional DC-DC converter 23 forms a discharging path, the positive end 231 and the negative end 232 represent an input side, and the positive end 233 and the negative end 234 represent an output side.

The positive electrode and the negative electrode of the auxiliary battery 30 are respectively connected to the positive end 231 and the negative end 232 of the bidirectional DC-DC converter 23. In addition, the positive electrode and the negative electrode of the auxiliary battery 30 are respectively connected to output terminals OUT1 and OUT2 through the relay 31. The output terminals OUT1 and OUT2 are connected to an electric field load of the electric vehicle, and the electric power may be supplied to the electric field load connected to the output terminals OUT1 and OUT2 from the auxiliary battery 30.

The relay 31 includes two switches 311 and 313, a resistor 312 for precharging, and a switch 314. A first end of the switch 311 is connected to the positive electrode of the auxiliary battery 30, and a second end of the switch 311 is connected to the output terminal OUT1. The resistor 312 and the switch 314 connected in series are connected in parallel to the switch 311. A first end of the switch 313 is connected to the negative electrode of the auxiliary battery 30, and a second end of the switch 313 is connected to the output terminal OUT2. The switch 311 and the switch 313 are operated according to the relay control signal RC5 generated by the MCU 21. When receiving an instruction of supplying the electric power to the electric field load from the ECU 6, the MCU 21 may generate a relay control signal RC5 for closing the relay 31. In this instance, the relay 22 may be in an open state. For example, the switch 313 and the switch 314 are turned on according to the on-level relay control signal RC5, the switch 311 is turned on after a predetermined time delay to close the relay 31, and the switch 311 is turned on to turn off the switch 314. The switch 311 and the switch 313 are turned off to open the relay 31 according to the off-level relay control signal RC5.

Referring to FIG. 1, the junction box 40 includes an input positive end connected to the first line 2, an input negative end connected to the second line 3, an output positive end connected to the third line 4, and an output negative end connected to the fourth line 5.

The junction box 40 may connect the battery pack device 10 and the devices 51 and 52 configured to the electric vehicle according to the relay control signal RC0 transmitted from the MCU 21. The MCU 21 may generate a relay control signal RC0 for controlling the junction box 40 based on the control signal (CS) received from the ECU 6 and the battery pack state signals (PS1 to PS4) received from the battery pack device 10. FIG. 1 illustrates two devices 51 and 52 from among various devices configured in the electric vehicle, and other devices requiring electric power may also be installed.

When the device 51 is an inverter for driving a motor of the electric vehicle, the inverter 51 may convert the electric power supplied from the battery pack device 10 through the junction box 40 and may supply it to the motor. When determining to supply electric power to the motor of the electric vehicle based on the control signal (CS), the MCU 21 may generate battery pack control signals (PC1 to PC4) and a relay control signal RC0 for closing the relays (11_1 to 11_4) and the junction box 40 so that the battery pack device 10 may be connected to the inverter 51 through the junction box 40. The BMSs (100_1 to 100_4) may generate relay control signals (RC1 to RC4) for closing the relays (11_1 to 11_4) according to the battery pack control signals (PC1 to PC4).

When the device 52 is a charger, the battery pack device 10 may be charged by the charger 52 connected through the junction box 40. To charge the battery pack device 10, when the charger 52 is connected to the junction box 40, the MCU 21 may sense this, and may generate battery pack control signals (PC1 to PC4) and a relay control signal RC0 for closing the relays (11_1 to 11_4) and the junction box 40. The BMSs (100_1 to 100_4) may generate relay control signals (RC1 to RC4) for closing the relays (11_1 to 11_4) according to the battery pack control signals (PC1 to PC4).

Figure 4:
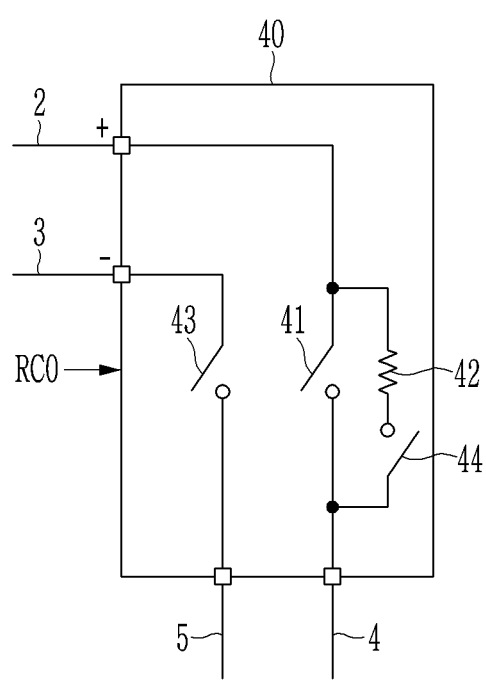
FIG. 4 shows a junction box according to an embodiment.

FIG. 4 shows a junction box 40 according to an embodiment.

As shown in FIG. 4, the junction box 40 includes two switches 41 and 43, a resistor 42 for precharging, and a switch 44. A first end of the switch 41 is connected to the first line 2, and a second end of the switch 41 is connected to the third line 4. The resistor 42 and the switch 44 connected in series are connected in parallel to the switch 41. A first end of the switch 43 is connected to the second line 3, and a second end of the switch 43 is connected to the fourth line 5. The switch 41 and the switch 43 are operated according to the relay control signal RC0 generated by the MCU 21. The MCU 21 may generate a relay control signal RC0 for closing the junction box 40 when determining that an instruction of supplying electric power to a motor is provided from the ECU 6 or a charger is connected. In this instance, the relay 22 may be in an open state. For example, the switch 43 and the switch 44 are turned on according to the on-level relay control signal RC0, the switch 41 is turned on after a predetermine time delay to close the junction box 40, and the switch 44 may be turned off after the switch 41 is turned on. The switch 41 and the switch 43 are turned off and the junction box 40 is opened according to the off-level relay control signal RC0.

A method for managing a battery system according to an embodiment will now be described with reference to FIG. 5

FIG. 5 shows a flowchart of a method for managing a battery system according to an embodiment.

The electric vehicle is turned off (S1), and the electric vehicle is not operated. By the control signal (CS) received from the ECU 6, the MCU 21 may sense that the electric vehicle does not run, and it may transmit battery pack control signals (PC1 to PC4) for requesting a sensing result of the battery pack voltage to the battery pack device 10.

The BMSs (100_1 to 100_4) of the respective battery packs (10_1 to 10_4) may measure voltages of the battery packs (10_1 to 10_4) according to corresponding battery pack control signals (PC1 to PC4) (S2). The measured voltages of the battery packs (10_1 to 10_4) are transmitted to the MCU 21 as battery pack state signals (PS1 to PS4).

The MCU 21 determines whether there is a battery pack that needs to be discharged or charged based on the received voltages of the battery packs (10_1 to 10_4) (S3). The battery pack with a voltage that is greater than a predetermined discharging threshold voltage from among the received voltages of the battery packs (10_1 to 10_4) needs to be discharged, and the battery pack with a voltage that is less than a predetermined charging threshold voltage needs to be charged. The discharging threshold voltage represents a reference voltage for determining a higher voltage from among the voltages of the battery packs (10_1 to 10_4), and it may be appropriately set depending on the battery packs (10_1 to 10_4). The charging threshold voltage represents a reference voltage for determining a lower voltage from among the voltages of the battery packs (10_1 to 10_4), and it may be appropriately set depending on the battery packs (10_1 to 10_4).

According to a determination result of S3, when there is no battery pack that needs to be discharged or charged from among the battery packs (10_1 to 10_4), step S2 for measuring respective voltages on the battery packs (10_1 to 10_4) may be repeated for each monitoring period.

According to the determination result of step S3, when there is a battery pack that needs to be discharged or charged from among the battery packs (10_1 to 10_4), the corresponding battery pack is connected to the auxiliary battery 30 (S4). For example, by a control of the MCU 21, a relay connected to the corresponding battery pack from among the relays (11_1 to 11_4) and the relay 22 are closed to connect the corresponding battery pack and the bidirectional DC-DC converter 23, and the corresponding battery is connected to the auxiliary battery 30 through the bidirectional DC-DC converter 23.

First, when there is a battery pack that needs to be discharged, the corresponding battery pack connected to the auxiliary battery 30 by S4 through the bidirectional DC-DC converter 23 is discharged (S51), the electric power supplied from the corresponding battery pack is transmitted to the auxiliary battery 30 through the bidirectional DC-DC converter 23, and the auxiliary battery 30 is accordingly charged.

The BMS of the corresponding battery pack measures the voltage of the corresponding battery pack for a discharging period and transmits it to the MCU 21 as a battery pack state signal. The MCU 21 determines whether the received voltage of the battery pack has reached a discharging reference voltage (S52). The discharging reference voltage may be set based on voltages of other battery packs except for the battery pack that is currently discharged, and for example, it may be set to be the lowest voltage from among the voltages of the other battery packs.

According to a determination result of S52, when the voltage of the corresponding battery pack has not reached the discharging reference voltage, the discharging operation of the corresponding battery pack is maintained (S51). According to the determination result of S52, when the voltage of the corresponding battery pack has reached the discharging reference voltage, the discharging operation of the corresponding battery pack ends (S7).

In another way, when there is a battery pack that needs to be charged, the auxiliary battery 30 is discharged after step S4, the electric power supplied from the auxiliary battery 30 is supplied to the corresponding battery pack through the bidirectional DC-DC converter 23, so the corresponding battery pack is charged (S61).

The BMS of the corresponding battery pack measures the voltage of the corresponding battery pack for a charging period to transmit it to the MCU 21 as a battery pack state signal. The MCU 21 determines whether the received voltage of the battery pack has reached a charging reference voltage (S62). The charging reference voltage may be set based on voltages of other battery packs except for the battery pack that is currently discharged, and for example, it may be set to be the lowest voltage from among the voltages of the other battery packs.

According to a determination result of step S62, when the voltage of the corresponding battery pack has not reached the charging reference voltage, the charging operation of the corresponding battery pack is maintained (S61). According to the determination result of step S62, when the voltage of the corresponding battery pack has reached the charging reference voltage, the charging operation of the corresponding battery pack ends (S8).

The connection between the corresponding battery pack and the auxiliary battery 30 is blocked after step S7 or S8 (S9). For example, by a control of the MCU 21, a relay connected to the corresponding battery pack from among the relays (11_1 to 11_4) and the relay 22 are opened to block the connection between the corresponding battery pack and the bidirectional DC-DC converter 23, and the connection between the auxiliary battery 30 and the corresponding battery pack is blocked.

The transmission and receiving of signals between the MCU 21 and the BMSs (100_1 to 100_4), the transmission and receiving of signals between the MCU 21 and the ECU 6, and the transmission and receiving of signals between the MCU 21 and the other constituent elements may be performed through communication lines or according to a radio communication method.

Further, the MCU 21 may maintain a remaining charged amount of the auxiliary battery 30 at about 40 to 60% for the purpose of charging or discharging.

In addition, the MCU 21 counts numbers of charging or discharging times with the auxiliary battery 30 for the respective battery packs (10_1 to 10_4), and when a count result reaches a predetermined threshold number of times, it may determine the corresponding pack to be a degraded battery pack or a battery pack at which a leakage current is generated, and may notify the ECU 6 thereof. Information on the corresponding battery pack may be displayed to the electric vehicle by control of the ECU 6.

According to the above-described embodiment, troubles such as ignition caused by the current between the battery packs connected in parallel may be prevented. Further, a voltage difference between the battery packs may be reduced, thereby reducing power consumption for balancing the voltage of the battery packs. When the balancing is performed by using the conventional precharging resistor and discharging the battery pack, electric power is consumed by the corresponding resistor and the device is damaged by generation of heat. However, according to the embodiment, the voltage difference between battery packs is steeply reduced by using the auxiliary battery before a connection in parallel, thereby solving the conventional problem.

Further, the electric power may be supplied to the electric field load configuring the electric vehicle or the energy storage system according to the electric power charged into the auxiliary battery, thereby improving electric power efficiency.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A battery system, comprising:
a plurality of battery packs;
a plurality of first relays, each first relay being connected to a respective one of the plurality of battery packs between a first line and a second line corresponding to the plurality of battery packs; and
an auxiliary battery,
wherein a first battery pack among the plurality of battery packs with a highest voltage is discharged to the auxiliary battery through a first relay of the plurality of first relays connected to the first battery pack so that a voltage of the first battery pack approaches a voltage of a third battery pack among the plurality of battery packs,
a second battery pack among the plurality of battery packs with a lowest voltage is charged by the auxiliary battery through a first relay of the plurality of first relays connected to the second battery pack so that a voltage of the second battery pack approaches the voltage of the third battery pack,
the plurality of battery packs are connected in parallel,
the first battery pack with the highest voltage is configured to be discharged to the auxiliary battery until the voltage of the first battery pack reaches a lowest voltage of the third battery pack among the plurality of battery packs, and
the second battery pack with the lowest voltage is configured to be charged by the auxiliary battery until the voltage of the second battery pack reaches the lowest voltage of the third battery pack among the plurality of battery packs.

2. The battery system of claim 1, further comprising:
a bidirectional DC-DC converter including first and second ends respectively connected to a positive electrode and a negative electrode of the auxiliary battery; and
a second relay connected among the first line, the second line, and third and fourth ends of the bidirectional DC-DC converter,
wherein a charging path or discharging path of the auxiliary battery includes the second relay and the bidirectional DC-DC converter.

3. The battery system of claim 2, wherein
when the first battery pack is discharged, electric power discharged from the first battery pack charges the auxiliary battery through the first relay connected to the first battery pack, the second relay, and the bidirectional DC-DC converter.

4. The battery system of claim 2, wherein when the second battery pack is charged by the auxiliary battery, electric power discharged from the auxiliary battery charges the second battery pack through the bidirectional DC-DC converter, the second relay, and the first relay connected to the second battery pack.

5. The battery system of claim 1, further comprising
a main control circuit configured to:
receive battery pack state signals, from the plurality of battery packs, for instructing states of the plurality of battery packs,
detect a battery pack among the plurality of battery packs that needs to be charged or discharged based on the battery pack state signals,
connect the detected battery pack and the auxiliary battery, and
control charging or discharging between the detected battery pack and the auxiliary battery.

6. The battery system of claim 5, wherein each of the plurality of battery packs includes a battery management system for generating the battery pack state signal for instructing the state of the battery pack by measuring a voltage, a current, and a temperature of the battery pack, and
each battery management system generates a relay driving signal for driving the respective first relay connected to the respective battery pack according to a control of the main control circuit.

7. The battery system of claim 5, further comprising:
a bidirectional DC-DC converter controlled by the main control circuit, and including first and second ends respectively connected to a positive electrode and a negative electrode of the auxiliary battery; and
a second relay controlled by the main control circuit, and connected among the first line, the second line, and third and fourth ends of the bidirectional DC-DC converter.

8. The battery system of claim 7, wherein when the first battery pack is discharged, the main control circuit controls the respective first relay connected to the first battery pack to be closed, and closes the second relay, and
the main control circuit controls electric power discharged from the first battery pack to be converted by the bidirectional DC-DC converter and to be supplied to the auxiliary battery.

9. The battery system of claim 7, wherein when the second battery pack is charged by the auxiliary battery, the main control circuit controls the respective first relay connected to the second battery pack to be closed, and closes the second relay, and
the main control circuit controls electric power discharged from the auxiliary battery to be converted by the bidirectional DC-DC converter and be supplied to the second battery pack.

10. A method for managing a battery system including a plurality of battery packs, a plurality of first relays and an auxiliary battery, each first relay being connected to a respective one of the plurality of battery packs between a first line and a second line corresponding to the plurality of battery packs, the method comprising:
electrically separating the plurality of battery packs;
detecting a battery pack needing to be charged or discharged from among the plurality of battery packs;
allowing a first battery pack among the plurality of battery packs with a highest voltage to be discharged to the auxiliary battery through a respective first relay connected to the first battery pack so that a voltage of the first battery pack approaches a voltage of a third battery pack among the plurality of battery packs; and
allowing a second battery pack among the plurality of battery packs with a lowest voltage to be charged by the auxiliary battery through a respective first relay connected to the second battery pack so that a voltage of the second battery pack approaches the voltage of the third battery pack,
wherein the first battery pack with the highest voltage is configured to be discharged to the auxiliary battery until the voltage of the first battery pack reaches a lowest voltage of the third battery pack among the plurality of battery packs, and
the second battery pack with the lowest voltage is configured to be charged by the auxiliary battery until the voltage of the second battery pack reaches the lowest voltage of the third battery pack among the plurality of battery packs.

11. The method of claim 10, wherein the allowing of the first battery pack to be discharged to the auxiliary battery includes:

allowing electric power discharged from the first battery pack to charge the auxiliary battery through the respective first relay connected to the first battery pack, a second relay, and a bidirectional DC-DC converter, and the second relay and the bidirectional DC-DC converter are connected between the respective first relay and the auxiliary battery.

12. The method of claim 10, wherein the allowing of the second battery pack to be charged by the auxiliary battery includes:

allowing electric power discharged from the auxiliary battery to charge the second battery pack through a bidirectional DC-DC converter, a second relay, and the respective first relay connected to the second battery pack with, and the second relay and the bidirectional DC-DC converter are connected between the respective first relay and the auxiliary battery.

13. The method of claim 10, further comprising:

receiving battery pack state signals for instructing states of the plurality of battery packs from the plurality of battery packs, wherein a battery pack needing to be charged or discharged from among the plurality of battery packs is detected based on the battery pack state signals.

14. The method of claim 13, further comprising:

generating the battery pack state signals for instructing a state of the plurality of battery packs by measuring voltages, currents, and temperatures of the plurality of battery packs.

15. The battery system of claim 1, wherein a target remaining charge amount of the auxiliary battery is in the range of 40% to 60%.

\* \* \* \* \*